United States Patent
Conn et al.

(10) Patent No.: US 6,775,363 B2
(45) Date of Patent: Aug. 10, 2004

(54) METHOD OF ANNOUNCING INFORMATION PERTAINING TO A CALLED PARTY TO A CALLING PARTY DURING CALL SET-UP

(75) Inventors: Gerard Conn, Brooklyn, NY (US); Michael C. Lamb, Bernardsville, NJ (US); Dale Paul Lifson, Warren, NJ (US); Gary A. Munson, Little Silver, NJ (US); Rajeev B. Patil, Holmdel, NJ (US); Brian Andrew Postlewait, Port Monmouth, NJ (US)

(73) Assignee: AT&T Corp., New York, NY (US)

( * ) Notice: Subject to any disclaimer, the term of this patent is extended or adjusted under 35 U.S.C. 154(b) by 77 days.

(21) Appl. No.: 10/067,455

(22) Filed: Feb. 5, 2002

(65) Prior Publication Data

US 2003/0179857 A1 Sep. 25, 2003

(51) Int. Cl.[7] .............................................. H04M 15/00
(52) U.S. Cl. ................ 379/114.1; 379/114.12; 379/115.01
(58) Field of Search ...................... 379/221.13, 201.01, 379/211.02, 221.02, 220.01, 205.01, 88.19, 114.05, 114.01, 127.01, 114.21, 114.28, 115.01, 115.02, 112.01, 114.02, 114.1, 114.12, 126; 455/445, 406, 433

(56) References Cited

U.S. PATENT DOCUMENTS

| 4,930,154 A | | 5/1990 | Bauer et al. |
|---|---|---|---|
| 5,056,134 A | | 10/1991 | Bauer et al. |
| 5,333,184 A | * | 7/1994 | Doherty et al. ......... 379/115.01 |
| 5,539,809 A | | 7/1996 | Mayer et al. |
| 5,903,639 A | * | 5/1999 | Lipchock et al. ...... 379/221.08 |
| 5,953,403 A | * | 9/1999 | Lefort et al. ........... 379/221.03 |
| 5,970,133 A | | 10/1999 | Salimando |
| 6,052,447 A | * | 4/2000 | Golden et al. ........... 379/114.1 |
| 6,125,173 A | * | 9/2000 | Jagadish et al. ......... 379/114.1 |
| 6,556,818 B1 | * | 4/2003 | Meehan ...................... 455/406 |
| 6,570,970 B2 | * | 5/2003 | Gruchala et al. ...... 379/127.01 |

* cited by examiner

Primary Examiner—Curtis Kuntz
Assistant Examiner—Barry W. Taylor

(57) ABSTRACT

A method of completing a call is disclosed. A call is received in a communications network from a first communication device subscribed to a communications carrier for a called party using a second communication device. A determination is made as to whether the first communication device subscribes to a Same Subscriber Service (SSS). If the first communication device does subscribe to SSS, a second determination is made as to whether the second communication device subscribes to the same communications carrier as the first communication device. If the second communication device subscribes to the same communications carrier as the first communication device, an announcement is provided to the first communication device. Special call treatment is applied to the call, and the call is routed to the second communication device.

110 Claims, 2 Drawing Sheets

METHOD OF ANNOUNCING INFORMATION PERTAINING TO A CALLED PARTY TO A CALLING PARTY DURING CALL SET-UP

FIELD OF THE INVENTION

The present invention is directed to a method of announcing information pertaining to a called party to a calling party during call set-up, and more particularly, to a method of announcing to the calling party, during call set-up, information about the nature of service provided on the call, where the service provided depends on some sort of relationship between the calling and called parties, and where that relationship may not a priori be known to the calling party.

BACKGROUND OF THE INVENTION

Many telephone calling plans currently exist or have previously existed which provide a subscriber (e.g., calling party) with a discount on one or more telephone calls made by the subscriber if certain conditions are met. For purposes of discussion, the terms subscriber and calling party will be used interchangeably throughout the specification.

For example, calling plans exist in which a subscriber is provided with a reduced per minute calling charge for particular types of telephone calls (e.g., long distance calls) which are made during a particular time frame (e.g., weekends, evenings, etc.). A higher per minute charge is billed for calls made outside of the plan discount period. While these calling plans are fairly easy to understand, these plans place restrictions on the subscriber's calling activity which may be undesirable to the subscriber. Many times, a monthly fee is also charged to the subscriber as part of enrolling in this type of service plan. The inclusion of the monthly fee results in a higher per minute charge for the discounted calls.

Other calling plans exist in which a telephone provider (e.g., Sprint) provides the subscriber with a flat rate fee for a specific number of calling minutes made from the subscriber's telephone for particular types of calls (e.g., interstate and intrastate long distance calls). If a subscriber exceeds the number of minutes that he/she has been allotted, the subscriber is charged a per minute fee for any additional minutes/calls. These types of calling plans are directed to high volume callers and are designed in theory to save the subscriber money. These plans are beneficial to the subscriber because they place minimal restrictions on the subscriber. However, these plans are not very beneficial from the standpoint of the telephone service provider because they do not increase brand loyalty.

Some local telephone companies also include calling plans which charge a flat rate fee for unlimited calls made to a particular local exchange. A local exchange call is an intrastate call to a called party located in an area which is a local toll charge to the calling party. A typical 10-digit telephone number has the format of (AAA)BBB-CCCC. In order for a call to be subject to the discount, it must have a predefined local exchange (i.e., the (AAA)BBB is predefined so, for example, all calls to a number starting with (908)555 would be subject to the flat rate fee). These discount plans are very narrowly defined and occur in an area where the local telephone company is typically a monopoly (i.e., there are not usually competing local telephone companies providing similar service). As such, subscriber loyalty is not an issue.

In service areas where competition is a concern, service plans have been contemplated in which discounts may be applied to calls made to called parties which subscribe to the same telephone service provider as the calling party (e.g., U.S. Pat. No. 5,333,184 referred to as Doherty). In Doherty, a Primary Interexchange Carrier (PIC) indicator is inserted into an Exchange Message Interface (EMI) record to indicate whether the called party has the same PIC as the calling party. This post processing of the call record for billing purposes allows a discount to be applied to the calling party's calls for those calls in which both the calling party and called party are PIC'd to the same carrier. Because the PIC determination process is completed after the call has been made, there is no way for the calling party to be informed at the time of the call if the discount will be applied to the particular call. The calling party will only know a priori that a discount is applicable if the calling party knows for some reason that the called party is PIC'd to the same carrier.

There is a need for a calling plan for which it is easy for a subscriber to understand when the plan is applicable and which is beneficial to the telephone service provider in that the plan promotes brand loyalty.

SUMMARY OF THE INVENTION

The present invention is directed to a method of informing a calling party during call set-up about information pertaining to the called party which is indicative of the call treatment that will be applied to the call. Such call treatment may include a discount to be applied to the call, different call routing treatment, or other type of service promotional treatment. As such, the calling party does not need to know prior to making the telephone call any information pertaining to the called party other than the called party's telephone number. By knowing the applicability of the call treatment prior to the completion of the call, the calling party can then take advantage of the call treatment status. Such action may take the form of using additional call minutes for the particular call. In addition, if the calling party is aware that the call treatment is not applicable to a particular call, the calling party can inform the called party of the availability of such call treatment which may result in the called party switching service to the particular telephone service provider.

In the case of a discount being applied to the call, the discount may take the form of a reduced per minute charge, an indication that the call will be subject to a monthly flat fee or other discount fee structure. Call routing treatment may include using higher quality routing techniques for calls subject to the call treatment (e.g., using routes with higher fidelity such as circuit switched routing as opposed to Internet Protocol (IP) routing, providing more alternative routes for routing the call or using routes with less delay, etc.) or routing the call over less congested routes. Other special call treatment which might be available to the calling party is a feature such as automatic call back on Busy if the called party line is busy. Such a feature may be available free of charge or at a reduced rate based on information pertaining to the called party. In addition, the present invention could be used in conjunction with other existing premium call features. For example, if a calling party uses three-way calling to add a second called party to a call in progress with a first called party, the present invention would provide an announcement to the calling party if special call treatment were applicable based on information pertaining to the second called party. The present invention provides the added benefit of providing the subscriber with a simple to use calling plan and the telephone service provider with a service plan that promotes brand loyalty. The present invention also provides the calling party with the benefit of knowing in real time when a call is subject to special call treatment by providing the calling party with information pertaining to the called party prior to the final placement of the call.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
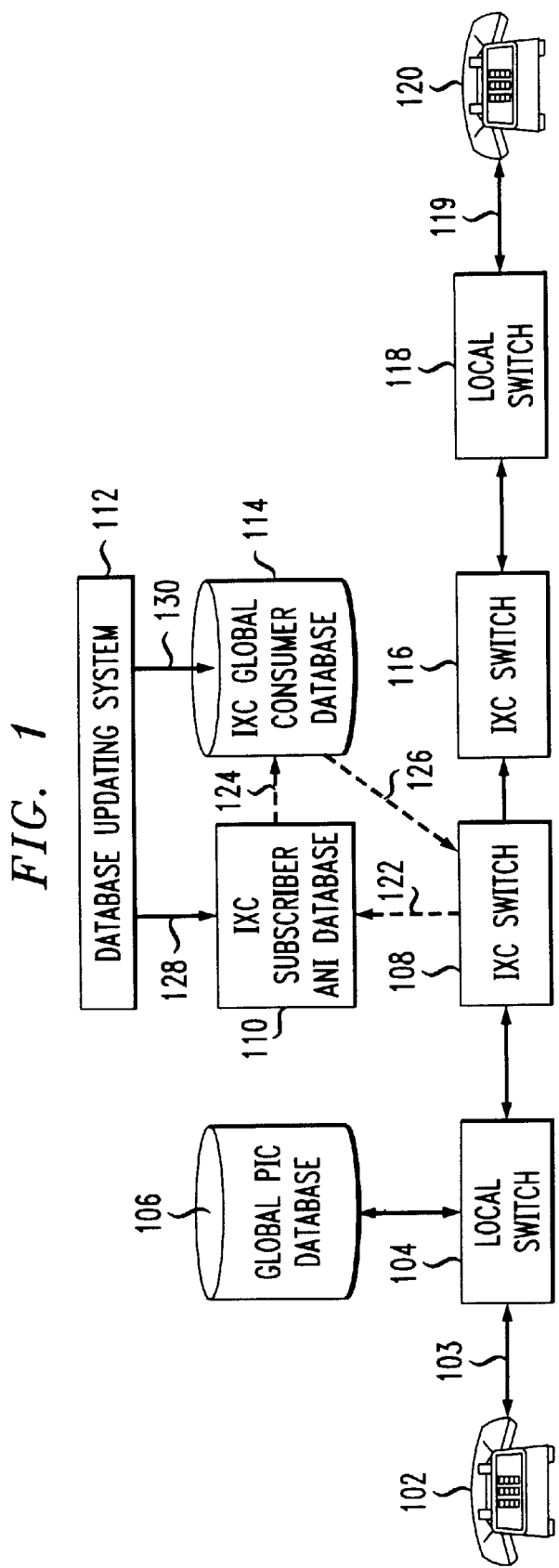
FIG. 1 is a block diagram of a network architecture in which the method of the present invention may be implemented.

FIG. 1 is a block diagram of a network architecture of a representative telephone communications network in which the method of the present invention may be implemented. The communications network generally includes a plurality of local switches 104, 118 and Interexchange Carrier (IXC) switches 108, 116. It is to be understood by those skilled in the art that switches illustrated in FIG. 1 are for purposes of describing the present invention and that any number or arrangement of switches may be used without departing from the scope and spirit of the present invention. The local switches and IXC switches may be operated by the same service provider or different service providers. For example, local switch 104 may be a central office operated by a service provider that provides local telephone service such as Verizon Communications. It is to be further appreciated by those skilled in the art that the local switch 104 associated with telephone 102 may be operated by a different service provider than the local switch 118 associated with telephone 118 depending upon the geographical location of the telephones since local switches are typically operated by regional service providers.

IXC switches 108, 116 are operated by a long distance service provider such as AT&T Corp. The IXC switches may be, for example, 5ESS or 4ESS switches manufactured by Lucent Technologies, Inc. Furthermore, in the case of a long distance reseller, the IXC switch may be operated by an entity (such as a long distance provider) which resells long distance service to the reseller. The reseller would then provide the subscriber with long distance service.

A number of databases are associated with the IXC switch 108 to provide IXC switch 108 with information relevant to the outgoing call and/or the subscriber. Such information may include service plans subscribed to by the subscriber, routing instructions for the call, a listing of features that may be invoked on the call, etc. An IXC Subscriber Automatic Number Identification (ANI) Database (ISAD) 110 stores information pertaining to the type of long distance service subscribed to for telephone 102 including service plan enrollment, eligibility for special features and other premium services, and call routing information. An IXC Global Consumer Database (IGCD) 114 contains an up-to-date listing of all subscribers to the IXC. It is to be understood by those skilled in the art that the use of two databases, namely ISAD 110 and IGCD 114, is merely exemplary of one implementation of the present invention. A single database could be used or multiple databases (e.g., the global database could be distributed among a number of databases) without departing from the scope and spirit of the present invention.

A Database Updating System (DUS) 112 receives feeds that indicate changes in subscriber status. The feeds can be provided in real-time as changes are received or periodically (e.g., once every 12 hours). The changes in subscriber status can include new subscribers, cancelled subscribers, delinquent subscribers, and profile changes for existing subscribers (e.g., change of service plans, addition/removal of applicable phone lines, etc.). It is important that the ISAD 110 and the IGCD 114 be populated with the most up-to-date IXC subscriber information. The DUS 112 provides periodic database feeds to the ISAD 110 and the IGCD 114. It is to be understood by those skilled in the art that the frequency of the feeds and method of performing the data feeds are not particular to the present invention and would be likely based on the need for data updating.

A plurality of communication devices are connected to the communications network for sending and receiving calls. As illustrated in FIG. 1, telephones 102 and 120 are connected to the communications network. It is to be understood by those skilled in the art that telephones 102 and 120 may be, for example, landline telephones, wireless telephones, personal communication devices or computers which include telephony capabilities.

Figure 2:
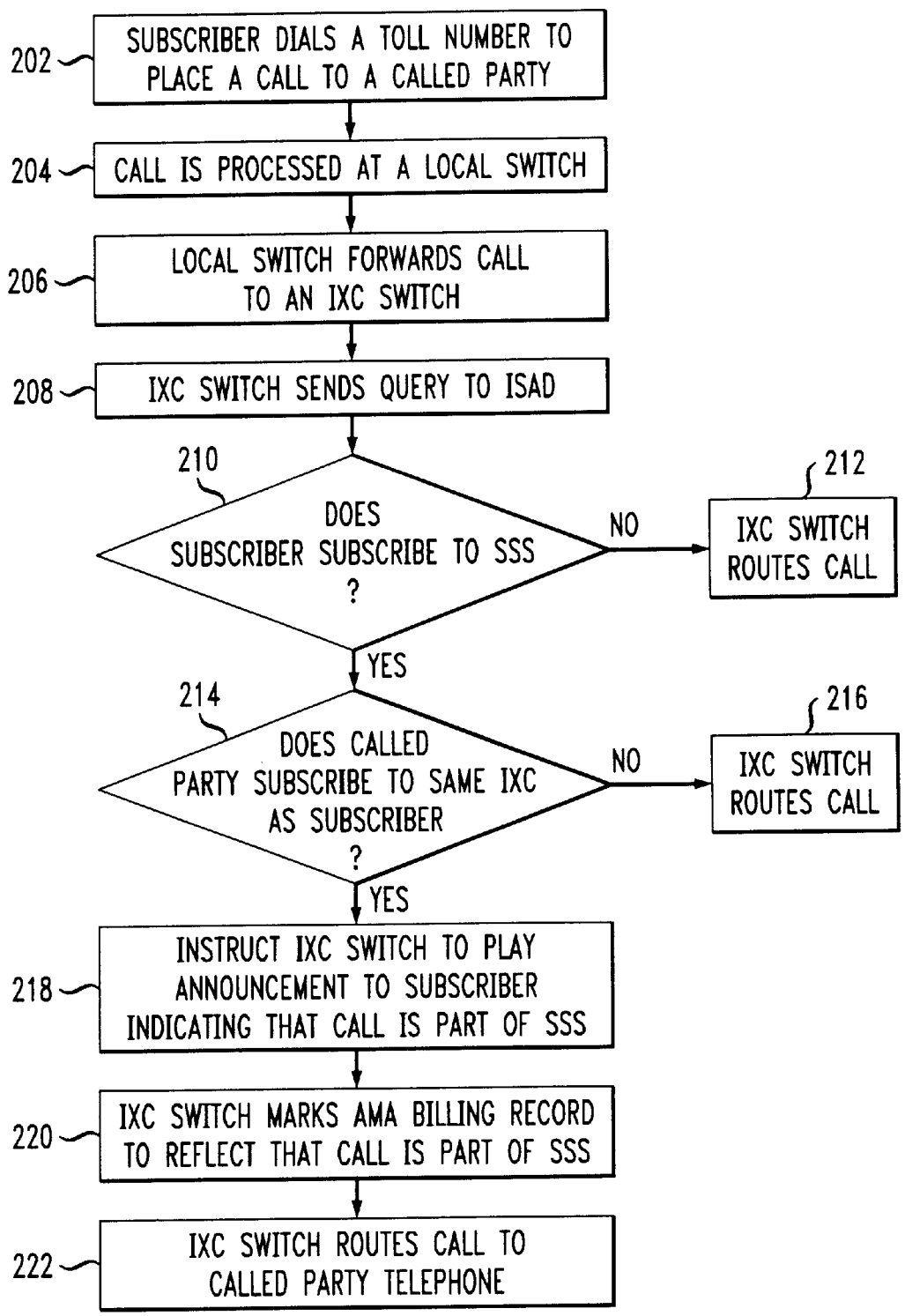
FIG. 2 is a flow chart depicting the network processing of an outgoing call in accordance with an embodiment of the present invention.

FIG. 2 shows an illustrative sequence of steps in accordance with this invention for operating the communications network of FIG. 1 as described above. A calling party uses telephone 102 to place a call to a called party at telephone 120 (step 202). The calling party dials a conventional telephone number corresponding to a national toll call number (e.g., a telephone number having the format AAA-BBB-CCCC where AAA is the area code, BBB is the local exchange and CCCC is the address of the specific line in the local exchange). It is to be understood by those skilled in the art that the present invention is applicable to any toll call including both what are commonly referred to as Inter-LATA and Intra-LATA calls.

The call is placed over a first communication line 103 to a local switch 104 which receives the call (step 204). The local switch 104 queries a global Primary Interexchange Carrier (PIC) database 106 to identify which service provider provides long distance service for communication line 103 and telephone 102. Identification of the service provider is based on the subscription associated with the telephone 102 to a particular long distance carrier (also referred to as an Interexchange Carrier (IXC). Once the long distance provider is identified, the call is communicated to IXC switch 108 that is operated by the identified long distance service provider (step 206).

In accordance with the present invention, the IXC switch 108 sends a query to an IXC Subscriber Automatic Number Identification (ANI) Database (ISAD) 110 via communication path 122 (step 208). The ANI corresponds to the telephone number of the communication line 103 associated with telephone 102. In an embodiment of the present invention, the ISAD 110 is queried to determine if telephone subscriber 102 is a subscriber to a service that provides special call treatment for those calls to telephones subscribed to the same long distance provider (hereinafter referred to as Same Subscriber Service (SSS)) (step 210). If the subscriber is not enrolled in SSS, the IXC switch 108 is instructed to route the call in a conventional manner (step 212).

If the ISAD 110 indicates that the subscriber is enrolled in the SSS, the ISAD 110 launches a query to an IXC Global Consumer Database (IGCD) 114 (step 214). The query includes the ANI for telephone 102 and the Dialed Number (DN) for the communication line 119 associated with telephone 120. If the DN is not found in the IGCD 114, the IXC switch 108 is instructed to route the call in a conventional manner (step 216). If the DN is found in the IGCD 114, then the IXC for telephone subscriber 120 is the same as the IXC for telephone subscriber 102 and an IXC match exists.

If is the IGCD 114 determines that both telephone subscriber 102 and telephone subscriber 120 subscribe to the same IXC (i.e., an IXC match), that information is communicated to the IXC switch 108. The IGCD 114 instructs the IXC switch 108 to play an announcement to the subscriber's telephone indicating that the call is part of SSS (step 218). Included in IXC switch 108 are announcement capabilities that are invoked by the switch 108 in response to the instructions from the IGCD 114. An announcement is played to the calling party. The announcement may be a service announcement (e.g., Thank you for using AT&T service"), identification of the IXC (e.g., "AT&T"), a series of tones or other sounds which are indicative to the calling party that a particular call treatment is applicable to the call (e.g., a sparkle or bong tone) or a combination of tones and voice announcements. Alternatively, an adjunct to the switch (not shown) such as, but not limited to an Advanced Intelligent Network peripheral device, may be used to play the announcement to the calling party. In such a case, the routing of the call to the calling party would be briefly interrupted so that the intelligent peripheral device could connect to telephone 102 to play the announcement. The intelligent peripheral device would then be dropped from the connection and the call would be routed.

In accordance with the present invention, the announcement to the calling party signifies a particular call treatment for the call. In some instances the call treatment may pertain to a particular calling plan in which preferential pricing is applied to the call. For example, a lower per minute charge may be applicable to the call. Alternatively, the announcement could communicate to the user that the call is part of a flat rate service plan in which unlimited calling minutes can be made to same IXC subscribers for a flat periodic rate (e.g., a flat rate of $20 a month could be charged). In such an instance, the IXC switch 108 marks an Automatic Message Account (AMA) record to reflect the discount applicable to the call (step 220). In the case of the call being part of a flat rate plan, the AMA record would reflect that the call should not be billed (i.e., on a per minute basis).

In a further embodiment of the present invention, the IXC match may invoke particular routing instructions to the IXC switch 108. In addition to the playing of the announcement, routing instructions may be communicated to the switch which may result in the call being routed in a particular manner. For example, the switch 108 may be instructed to use a direct routing path which is subject to congestion, or alternatively, may provide a preferential routing path which avoids congested circuits. In addition, the IXC match could determine whether the call is routed over an Internet Protocol (IP) network or the Public Switched Telephone Network (PSTN). It is to be understood by those skilled in the art that the specifics of the call treatment would be determined by the IXC based on marketing data, network conditions, cost considerations, and other considerations for priority routing.

Once the IXC switch 108 has played the announcement to telephone 102 and received any routing instructions, the call is routed through the IXC network via IXC switch 116 to a local switch 118 associated with communication line 119 and telephone 120 (step 222). Call completion continues when telephone 120 is answered by the called party.

While the present invention has been described in connection with the illustrated embodiments, it will be appreciated and understood that modifications may be made without departing from the true spirit and scope of the invention. For example, while the present invention is described with reference to a service based on the IXC to which telephone 102 is subscribed, other methods such as calling cards or temporary affiliations with a particular subscriber could be used to trigger special call treatment if the called party subscribes to the same IXC. Furthermore, the method could be based on a calling party and called party being associated with a predefined group. The predefined group could be, but is not limited to a group of one or more communication carriers, resellers or business affiliates. Business affiliates can include advertisers, or marketing relationships between one or more service providers. Upon determination that the calling party and called party are associated with the predefined group, an announcement is provided to the calling party and special call treatment is applied to the call. Other predefined groups could be determined based on parameters associated with the calling party and/or called party. Such parameters may include the length of time that a party has subscribed to a particular communications carrier or a subscriber's call volume for a particular period of time. It is further contemplated that the calling party and called party may belong to more than one predefined group. As such, it would only take a matching of a single predefined group between the calling party and called party to invoke special call treatment. Furthermore, membership in each different predefined group may result in a different call treatment outcome. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method of completing a call comprising:
   receiving a call in a communications network from a first communication device subscribed to a communications carrier for a called party using a second communication device;
   determining if the first communication device subscribes to a Same Subscriber Service (SSS);
   if the first communication device does subscribe to SSS, determining if the second communication device subscribes to the same communications carrier as the first communication device;
   if the second communication device subscribes to the same communications carrier as the first communication device, providing an announcement to the first communication device advising of special call treatment to which the call is entitled;
   applying special call treatment to the call; and
   routing the call to the second communication device.

2. The method of claim 1 wherein said step of determining if the first communication device subscribes to SSS further comprises the steps of:
   providing a database with data that identifies the first communication device; and
   querying a database using the data to determine if the first communication device subscribes to SSS.

3. The method of claim 2 wherein the data comprises an Automatic Number Identification (ANI) associated with the first communication device.

4. The method of claim 1 wherein said step of determining if the second communication device subscribes to the same communications carrier as the first communication device further comprises the steps of:

provuding a database with a Dialed Number (DN) by the first communication device; and querying the database using the DN to determine the communication carrier for the second communication device.

5. The method of claim 1 wherein the announcement includes the identification of the communications carrier.

6. The method of claim 1 wherein the announcement includes at least one tone.

7. The method of claim 1 wherein the announcement includes both tones and voice.

8. The method of claim 1 wherein the announcement includes identification of SSS.

9. The method of claim 1 wherein said special call treatment comprises billing the call at a discounted rate.

10. The method of claim 9 wherein said discounted rate comprises a flat rate applicable to all SSS calls made within a predetermined time period.

11. The method of claim 10 wherein said predetermined time period is one month.

12. The method of claim 9 wherein said discounted rate comprises a reduced per minute charge for the call.

13. The method of claim 1 wherein said special call treatment comprises using preferential routing to route the call to the second communication device.

14. The method of claim 13 wherein said preferential routing comprises routing the call over an Internet Protocol (IP) network.

15. The method of claim 13 wherein said preferential routing comprises routing the call over the Public Switched Telephone Network (PSTN).

16. The method of claim 1 wherein said first communication device is a telephone.

17. The method of claim 1 wherein said first communication device is a wireless telephone.

18. The method of claim 1 wherein said first communication device is a personal communication device.

19. The method of claim 1 wherein said first communication device is a computer having telephony capabilities.

20. The method of claim 1 wherein said second communication device is a telephone.

21. The method of claim 1 wherein said second communication device is a wireless telephone.

22. The method of claim 1 wherein said second communication device is a personal communication device.

23. The method of claim 1 wherein said second communication device is a computer having telephony capabilities.

24. A method of announcing to a calling party during call set-up applicability of special call treatment comprising the steps of:

receiving a call from a first communication device subscribed to a communication carrier intended for a second communication device in a communication network, determining if the first communication device subscribes to a Same Subscriber Service (SSS);

if the first communication device subscribes to SSS, determining if the second communication device subscribes to a same communications carrier as the first communication device;

if the second communication device subscribes to the same communications carrier, providing an announcement to the first communication device, the announcement including an indication that the SSS is applicable to the call and advising of special call treatment to which the call is entitled.

25. The method of claim 24 wherein said step of determining if the first communication device subscribes to SSS further comprises the steps of:

providing a database with data that identifies the first communication device; and querying a database using the data to determine if the first communication device subscribes to SSS.

26. The method of claim 25 wherein the data comprises an Automatic Number Identification (ANI) associated with the first communication device.

27. The method of claim 24 wherein said step of determining if the second communication device subscribes to the same communications carrier as the first communication device further comprises the steps of:

providing a database with a Dialed Number (DN) by the first communication device; and querying the database using the DN to determine the communication carrier for the second communication device.

28. The method of claim 24 wherein the announcement includes the identification of the communications carrier.

29. The method of claim 24 wherein the announcement includes at least one tone.

30. The method of claim 24 wherein the announcement includes both tones and voice.

31. The method of claim 24 wherein the announcement includes identification of SSS.

32. The method of claim 24 further comprising the steps of:

applying special call treatment to the call; and routing the call to the second communication device.

33. The method of claim 32 wherein said special call treatment comprises billing the call at a discounted rate.

34. The method of claim 33 wherein said discounted rate comprises a flat rate applicable to all SSS calls made within a predetermined time period.

35. The method of claim 34 wherein said predetermined time period is one month.

36. The method of claim 33 wherein said discounted rate comprises a reduced per minute charge for the call.

37. The method of claim 32 wherein said special call treatment comprises using preferential routing to route the call to the second communication device.

38. The method of claim 37 wherein said preferential routing comprises routing the call over an Internet Protocol (IP) network.

39. The method of claim 37 wherein said preferential routing comprises routing the call over the Public Switched Telephone Network (PSTN).

40. The method of claim 24 wherein said first communication device is a telephone.

41. The method of claim 24 wherein said first communication device is a wireless telephone.

42. The method of claim 24 wherein said first communication device is a personal communication device.

43. The method of claim 24 wherein said first communication device is a computer having telephony capabilities.

44. The method of claim 24 wherein said second communication device is a telephone.

45. The method of claim 24 wherein said second communication device is a wireless telephone.

46. The method of claim 24 wherein said second communication device is a personal communication device.

47. The method of claim 24 wherein said second communication device is a computer having telephony capabilities.

48. A method of completing a call comprising:
receiving a call in a communications network from a first communication device subscribed to a communications carrier for a called party using a second communication device;
determining if the first communication device subscribes to a Same Subscriber Service (SSS);
if the first communication device does subscribe to SSS, determining if the second communication device subscribes to the same communications carrier as the first communication device;
if the second communication device subscribes to the same communications carrier as the first communication device, providing an announcement to the first communication device, the announcement including an indication that the SSS is applicable to the call and advising of special call treatment to which the call is entitled;
applying special call treatment to the call wherein said called is billed at a discounted rate; and
routing the call to the second communication device.

49. The method of claim 48 wherein said step of determining if the first communication device subscribes to SSS further comprises the steps of:
providing a database with data that identifies the first communication device; and
querying a database using the data to determine if the first communication device subscribes to SSS.

50. The method of claim 49 wherein the data comprises an Automatic Number Identification (ANI) associated with the first communication device.

51. The method of claim 48 wherein said step of determining if the second communication device subscribes to the same communications carrier as the first communication device further comprises the steps of:
providing a database with a Dialed Number (DN) by the first communication device; and
querying the database using the DN to determine the communication carrier for the second communication device.

52. The method of claim 48 wherein the announcement includes the identification of the communications carrier.

53. The method of claim 48 wherein the announcement includes at least one tone.

54. The method of claim 48 wherein the announcement includes both tones and voice.

55. The method of claim 48 wherein the announcement includes identification of SSS.

56. The method of claim 48 wherein said discounted rate comprises a flat rate applicable to all SSS calls made within a predetermined time period.

57. The method of claim 56 wherein said predetermined time period is one month.

58. The method of claim 48 wherein said discounted rate comprises a reduced per minute charge for the call.

59. The method of claim 48 wherein said special call treatment comprises using preferential routing to route the call to the second communication device.

60. The method of claim 59 wherein said preferential routing comprises routing the call over an Internet Protocol (IP) network.

61. The method of claim 59 wherein said preferential routing comprises routing the call over the Public Switched Telephone Network (PSTN).

62. The method of claim 48 wherein said first communication device is a telephone.

63. The method of claim 48 wherein said first communication device is a wireless telephone.

64. The method of claim 48 wherein said first communication device is a personal communication device.

65. The method of claim 48 wherein said first communication device is a computer having telephony capabilities.

66. The method of claim 48 wherein said second communication device is a telephone.

67. The method of claim 48 wherein said second communication device is a wireless telephone.

68. The method of claim 48 wherein said second communication device is a personal communication device.

69. The method of claim 48 wherein said second communication device is a computer having telephony capabilities.

70. A method of completing a call comprising:
receiving a call in a communications network from a first communication line serviced by a communications carrier for a called party serviced by a second communication line;
determining if the first communication line is enrolled in a Same Subscriber Service (SSS);
if the first communication line is enrolled in SSS, determining if the second communication line is serviced by the same communications carrier as the first communication line;
if the second communication line is serviced by the same communications carrier as the first communication line, providing an announcement to a first communication device associated with the first communication line and advising of special call treatment to which the call is entitled;
applying special call treatment to the call; and
routing the call to a second communication device associated with the second communication line.

71. The method of claim 70 wherein said step of determining if the first communication line is enrolled in SSS further comprises the steps of:
providing a database with data that identifies the first communication line; and
querying a database using the data to determine if the first communication line is enrolled in SSS.

72. The method of claim 71 wherein the data comprises an Automatic Number Identification (ANI) associated with the first communication line.

73. The method of claim 70 wherein said step of determining if the second communication line is serviced by the same communications carrier as the first communication line further comprises the steps of:
providing a database with a Dialed Number (DN) by the first communication device; and
querying the database using the DN to determine the communication carrier for the second communication line.

74. The method of claim 70 wherein the announcement includes the identification of the communications carrier.

75. The method of claim 70 wherein the announcement includes at least one tone.

76. The method of claim 70 wherein the announcement includes both tones and voice.

77. The method of claim 70 wherein the announcement includes identification of SSS.

78. The method of claim 70 wherein said special call treatment comprises billing the call at a discounted rate.

79. The method of claim 78 wherein said discounted rate comprises a flat rate applicable to all SSS calls made within a predetermined time period.

80. The method of claim 79 wherein said predetermined time period is one month.

81. The method of claim 78 wherein said discounted rate comprises a reduced per minute charge for the call.

82. The method of claim 70 wherein said special call treatment comprises using preferential routing to route the call to the second communication device.

83. The method of claim 82 wherein said preferential routing comprises routing the call over an Internet Protocol (IP) network.

84. The method of claim 82 wherein said preferential routing comprises routing the call over the Public Switched Telephone Network (PSTN).

85. The method of claim 70 wherein said first communication device is a telephone.

86. The method of claim 70 wherein said first communication device is a wireless telephone.

87. The method of claim 70 wherein said first communication device is a personal communication device.

88. The method of claim 70 wherein said first communication device is a computer having telephony capabilities.

89. The method of claim 70 wherein said second communication device is a telephone.

90. The method of claim 70 wherein said second communication device is a wireless telephone.

91. The method of claim 70 wherein said second communication device is a personal communication device.

92. The method of claim 70 wherein said second communication device is a computer having telephony capabilities.

93. A method of completing a call comprising:
receiving a call in a communications network from a first subscriber associated with a predefined group for a called party;
determining if the first subscriber subscribes to a Same Group Service (SGS);
if the first subscriber does subscribe to SGS, determining if the called party is associated with the same predefined group as the first subscriber;
if the called party is associated with the same predefined group as the first subscriber, providing an announcement to the first subscriber and advising of special call treatment to which the call is entitled;
applying special call treatment to the call; and
routing the call to the called party.

94. The method of claim 93 wherein said step of determining if the first subscriber subscribes to SGS further comprises the steps of:
providing a database with data that identifies the first subscriber; and
querying a database using the data to determine if the first subscriber subscribes to SGS.

95. The method of claim 94 wherein the data comprises an Automatic Number Identification (ANI).

96. The method of claim 93 wherein said step of determining if the called party is associated with the same predefined group as the first subscriber further comprises the steps of:
providing a database with a Dialed Number (DN) by the first subscriber; and
querying the database using the DN.

97. The method of claim 93 wherein the announcement includes the identification of the predefined group.

98. The method of claim 93 wherein the announcement includes at least one tone.

99. The method of claim 93 wherein the announcement includes both tones and voice.

100. The method of claim 93 wherein the announcement includes identification of SGS.

101. The method of claim 93 wherein said special call treatment comprises billing the call at a discounted rate.

102. The method of claim 101 wherein said discounted rate comprises a flat rate applicable to all SGS calls made within a predetermined time period.

103. The method of claim 102 wherein said predetermined time period is one month.

104. The method of claim 101 wherein said discounted rate comprises a reduced per minute charge for the call.

105. The method of claim 93 wherein said special call treatment comprises using preferential routing to route the call to the called party.

106. The method of claim 105 wherein said preferential routing comprises routing the call over an Internet Protocol (IP) network.

107. The method of claim 105 wherein said preferential routing comprises routing the call over the Public Switched Telephone Network (PSTN).

108. The method of claim 93 wherein said predefined group includes one or more communication carriers.

109. The method of claim 93 wherein said predefined group includes one or more resellers.

110. The method of claim 93 wherein said predefined group includes one or more business affiliates.

* * * * *